O. D. WETMORE.
Water-Wheel.

No. 129,075.

Patented July 16, 1872.

Witnesses
Chas. Nida
W. A. Graham

Inventor:
O. D. Wetmore
per
Attorneys.

UNITED STATES PATENT OFFICE.

ORLANDO D. WETMORE, OF CLAREMONT, NEW HAMPSHIRE.

IMPROVEMENT IN WATER-WHEELS.

Specification forming part of Letters Patent No. 129,075, dated July 16, 1872.

Specification describing a new and useful Improvement in Water-Wheel, invented by ORLANDO D. WETMORE, of the town of Claremont, in the county of Sullivan and State of New Hampshire.

Figure 1:
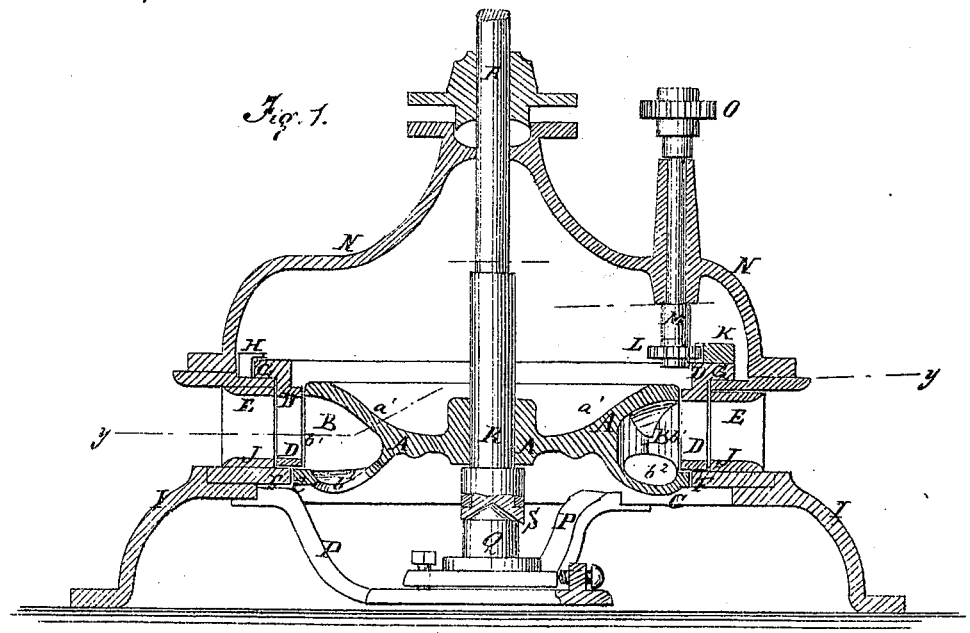
Figure 2:
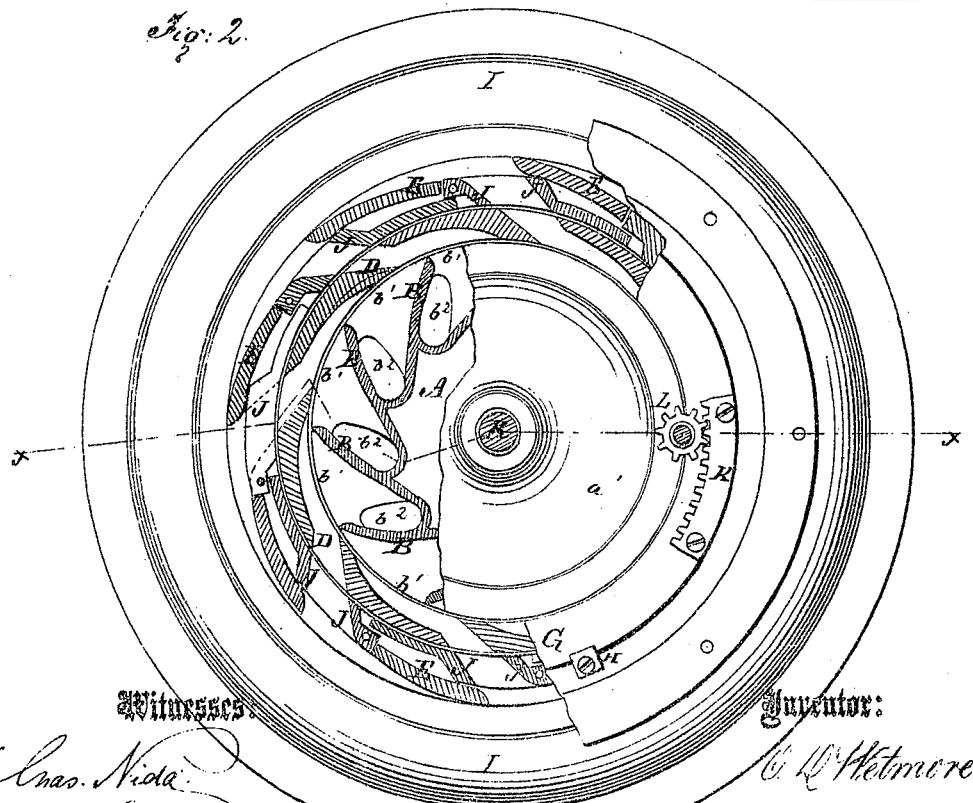

In the accompanying drawing, Figure 1 is a detail vertical section of my improved water-wheel taken through the line $x\,x$, Fig. 2. Fig. 2 is a detail irregular section of the same taken through the line $y\,y$, Fig. 1.

Similar letters of reference indicate corresponding parts.

My invention has for its object to furnish an improved water-wheel, simple in construction, and effective in operation, and more readily controlled than water-wheels constructed in the ordinary manner; and it consists in the construction and combination of various parts of the wheel, as hereinafter more fully described.

A is the wheel, the top or dish $a'$ of which starts with a straight incline and then curves downward, as shown in Fig. 1. B are the buckets, which are formed in the rim of the wheel A. The buckets B are made straight at the point, and are then curved back, as shown in Fig. 2. The inlets $b^1$ to the buckets B are formed in the rim or face of the wheel, and the outlets $b^2$ in the bottom plate of the wheel A, as shown in Figs. 1 and 2. The bottom plate of the wheel A projects beyond the buckets B to form a flange, C, as shown in Fig. 1, for the movable chute D to rest upon, so that the said chute D may cover the joint between the wheel A and the stationary chute E, and thus prevent leakage or waste of water. The lower edge of the movable chute D also rests upon an inwardly-projecting flange, F, of the stationary chute E. Upon the upper edge of the movable chute D is formed an outwardly-projecting flange, G, which overlaps the top of the stationary chute E. The movable chute D is secured in place upon the stationary chute E, and at the same time allowed to move freely by buttons or lugs H secured to said stationary chute E, and which overlap the flange G of said movable chute. The chute D thus serves as a gate for regulating or preventing the ingress of the water. The stationary chute E is securely attached to the lower case I, which is made bell-shaped, as shown in Fig. 1, to allow the water to escape freely. In the outer or stationary chute E are placed guides J, which are pivoted near their outer ends, and are so formed that the pressure of the inflowing water may hold their inner parts close against the movable chute D, thus preventing leakage. To the top of the movable chute D is attached a segment, K, of a toothed wheel or rack, into the teeth of which mesh the teeth of a small gear-wheel, L, attached to the lower end of a vertical shaft, M, which passes up through the top casing N, and is operated by a hand-wheel, O, or other device attached to its upper end. To the lower case I, or to other suitable support, is attached the spider P that supports the step Q, which enters a socket in the lower end of shaft R, to which the wheel A is attached. The step-socket is lined with an anti-friction or composition lining, S, as shown in Fig. 1.

Having thus described my invention, I claim as new and desire to secure by Letters Patent—

1. The arrangement of the movable chute D, in connection with the flange C of the wheel A and the flange F of the stationary chute E, substantially as herein shown and described, and for the purpose set forth.

2. The pivoted guides J, in combination with the stationary chute E and the movable chute D, substantially as herein shown and described, and for the purpose set forth.

ORLANDO D. WETMORE.

Witnesses:
HERMON HOLT,
HENRY TUCKER.